(12) United States Patent
Matsuo

(10) Patent No.: US 7,736,129 B2
(45) Date of Patent: Jun. 15, 2010

(54) COOLING FAN FOR ROTATING MACHINE

(75) Inventor: Seiji Matsuo, Kawagoe (JP)

(73) Assignee: Denyo Kabushiki Kaisha, Tokyo-To (JP)

( * ) Notice: Subject to any disclaimer, the term of this patent is extended or adjusted under 35 U.S.C. 154(b) by 394 days.

(21) Appl. No.: 11/500,504

(22) Filed: Aug. 8, 2006

(65) Prior Publication Data
US 2008/0019834 A1 Jan. 24, 2008

(30) Foreign Application Priority Data
Jul. 19, 2006 (JP) .............................. 2006-197240

(51) Int. Cl.
*F01D 5/22* (2006.01)
(52) U.S. Cl. ................ 416/186 R; 416/203; 416/223 B
(58) Field of Classification Search .................. 416/175, 416/185, 186 R, 188, 203, 223 B
See application file for complete search history.

(56) References Cited

U.S. PATENT DOCUMENTS

| | | | | |
|---|---|---|---|---|
| 1,613,318 | A | * | 1/1927 | Fedler .......................... 68/134 |
| 2,054,144 | A | * | 9/1936 | Swigert ................... 416/186 R |
| 4,521,154 | A | * | 6/1985 | Corbett ........................ 416/175 |
| 6,648,602 | B2 | * | 11/2003 | Horng et al. ................. 416/203 |
| 6,846,157 | B1 | * | 1/2005 | Park ........................... 415/206 |
| 7,163,374 | B2 | * | 1/2007 | Lee et al. ................. 416/186 R |
| 7,201,565 | B2 | * | 4/2007 | Ku et al. ...................... 416/175 |
| 7,481,616 | B2 | * | 1/2009 | Tamagawa et al. ........... 415/176 |

\* cited by examiner

*Primary Examiner*—Edward Look
*Assistant Examiner*—Ryan H Ellis
(74) *Attorney, Agent, or Firm*—Jacobson Holman PLLC

(57) ABSTRACT

A cooling fan for rotating machine having a sufficient cooling performance, mass production performance and easiness in mounting is provided. A centrifugal fan mounted to a rotating shaft 21 of rotating machine for introducing a cooling air to the rotating machine, is provided with a hub 12 mounted at the rotating shaft, a main plate 11 formed in ring shape and disposed concentrically at the hub, a side plate 14 in ring shape having the outer circumference smaller than the inner circumference of the main plate and formed integrally with the hub so that it is disposed with an interval to the main plate in the axial direction of the rotating shaft, and a plurality of impeller blades 13 implanted on the hub and disposed along the axial direction of the rotating shaft and regularly in the radial direction so as to connect the main plate to the hub to form a space between the main plate, the side plate and the hub, some impeller blades 13*a* of said impeller blades being constituted to reach the outermost circumference portion in the radial direction, while the others 13*b* reaching only the middle, wherein the main plate and the side plate are formed so that they are not overlapped with each other when seen from the axial direction of the rotating shaft.

4 Claims, 4 Drawing Sheets

COOLING FAN FOR ROTATING MACHINE

BACKGROUND OF THE INVENTION

1. Field of the Invention

The present invention relates to a cooling fan for rotating machine, particularly a rotating electric apparatus, and more particularly, to a cooling fan whose structure is improved so that productivity can be improved while high cooling performance is maintained.

2. Related Art

Reduction of size, weight and price of electric machine is in progress. With this trend, an insulation class with a high temperature rise limit is employed as an insulating material to be used, and improvement of cooling capacity in a generator is being promoted. On the other hand, mass production performance and easiness in mounting are also important in mass production of rotating machine.

In order to satisfy these requirements as appropriate, a cooling fan as disclosed in the Patent Document 1 is provided. In this cooling fan, considering molding by a die, notches 1a are provided with an equal interval on the outer circumference side of a main plate 1 and an impeller blade 2b in the axial direction is provided so that fan-shaped plates (side plate) 2a are disposed at positions where the portion of these notches 1a are projected in the axial direction so as to constitute a main plate and a side plate which are not overlapped with each other when seen in the axial direction.

Thus, a cooling fan "F" is formed in which air channels using a centrifugal fan action surrounded by the main plate, the side plate and the impeller blade are arranged intermittently in the circumferential direction.

[Patent Document 1] Japanese Utility Model Laid-Open No. H5-58845

However, in the cooling fan provided by the Patent Document 1, since the air channels as centrifugal fans are arranged only intermittently in the circumferential direction of the fan "F", its cooling capacity is not necessarily sufficient.

The present invention was made in view of the above points and its object is to provide a cooling fan for rotating machine provided with sufficient cooling performance as well as mass production performance and easiness in mounting.

SUMMARY OF THE INVENTION

In order to achieve the above object, the present invention provides a centrifugal fan mounted to a rotating shaft of rotating machine for introducing a cooling air to the rotating machine, provided with:

a hub mounted at the rotating shaft;

a main plate formed in the ring state and disposed concentrically at the hub;

a side plate in the ring state having the outer circumference smaller than the inner circumference of the main plate and formed integrally with the hub so that it is disposed with an interval to the main plate in the axial direction of the rotating shaft; and a plurality of impeller blades implanted on the hub and disposed along the axial direction of the rotating shaft and regularly in the radial direction so as to connect the main plate to the hub to form a space between the main plate, the side plate and the hub, some of the impeller blades being constituted to reach the outermost circumference portion in the radial direction, while the others reaching only the middle, wherein the main plate and the side plate are formed so that they are not overlapped with each other when seen from the axial direction of the rotating shaft.

In the present invention, as mentioned above, since the cooling fan is constituted in which impeller blades with different lengths in the radial direction are disposed between the main plate and the side plate formed so that they are not overlapped with each other when seen from the axial direction of the rotating shaft, a centrifugal air channel is basically formed over the entire circumference and moreover, stripping can be carried out without trouble and a space is ensured between the cooling fan and members adjacent thereto. Therefore, a cooling fan which is excellent all in cooling performance, mass production performance and easiness in mounting can be provided.

DETAILED DESCRIPTION OF THE INVENTION

An embodiment of the present invention will be described below referring to FIGS. 1 to 3.

Embodiment 1

Figures 1A, 1B:
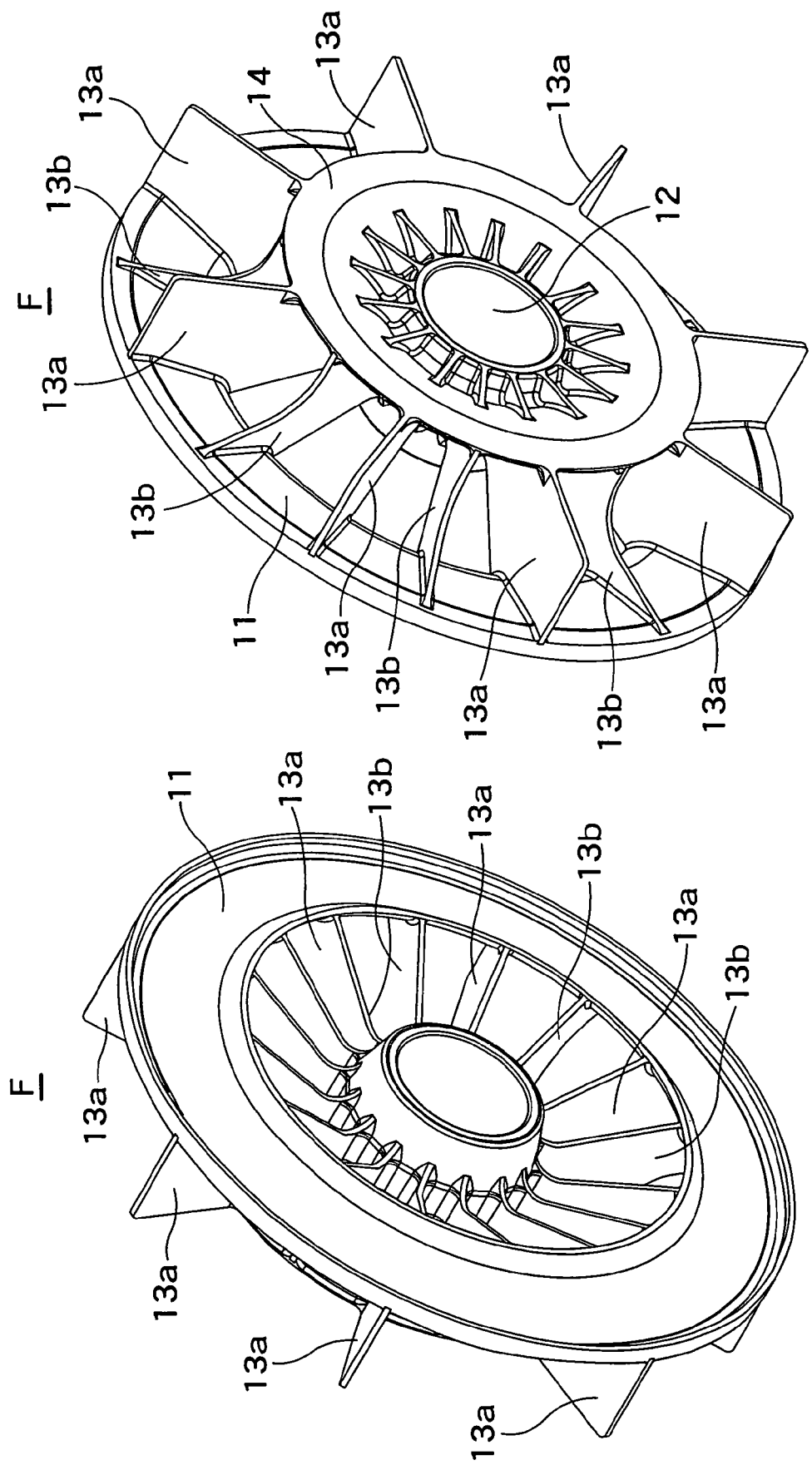
FIGS. 1A and 1B are perspective views showing a construction of an embodiment of the present invention.

FIGS. 1A and 1B show an embodiment of the present invention, in which FIG. 1A is a perspective view showing a state when seen from the main plate side of a cooling fan "F", and FIG. 1B is a perspective view showing a state when seen from the side plate side.

As shown in FIG. 1A, a main plate 11 has an entire structure in ring shape with a hole at the center portion, and a hub 12 to be mounted to a rotating shaft (not shown) is provided at its center position. And the main plate 11 and the hub 12 are connected by impeller blades 13a, 13b.

As shown in FIG. 1A and FIG. 1B seen from the side opposite to FIG. 1A, a side plate 14 is provided on the side opposite to the main plate 11 in the axial direction of the hub 12, while the side plate 14 is directly connected to the hub 12, and the impeller blades 13a, 13b are provided so as to connect the main plate 11 and the side plate 14 to the hub 12.

Here, as can be seen from FIG. 1B, the main plate 11 is provided in the ring shape on the outer circumference with a clearance in the circumferential direction to the hub 12, while the side plate 14 has an outer circumference not larger than an inner circumference of the main plate 11. Thus, the main plate 11 and the side plate 14 are not overlapped with each other, by which stripping is not obstructed. Therefore, the cooling fan can be manufactured by molding using a die, which is suitable for mass production.

The impeller blades 13a, 13b are arranged alternately in the circumferential direction, but their sizes are different from each other. The impeller blade 13a has a width from the hub 12 to the position corresponding to the outer circumference of the main plate 11, while the impeller blade 13b has its end close to the side plate 14 gouged in the arc state when seen from the side face. As a result, a space corresponding to the gouged portion of the impeller blade 13b is formed between the two impeller blades 13a.

Figure 2:
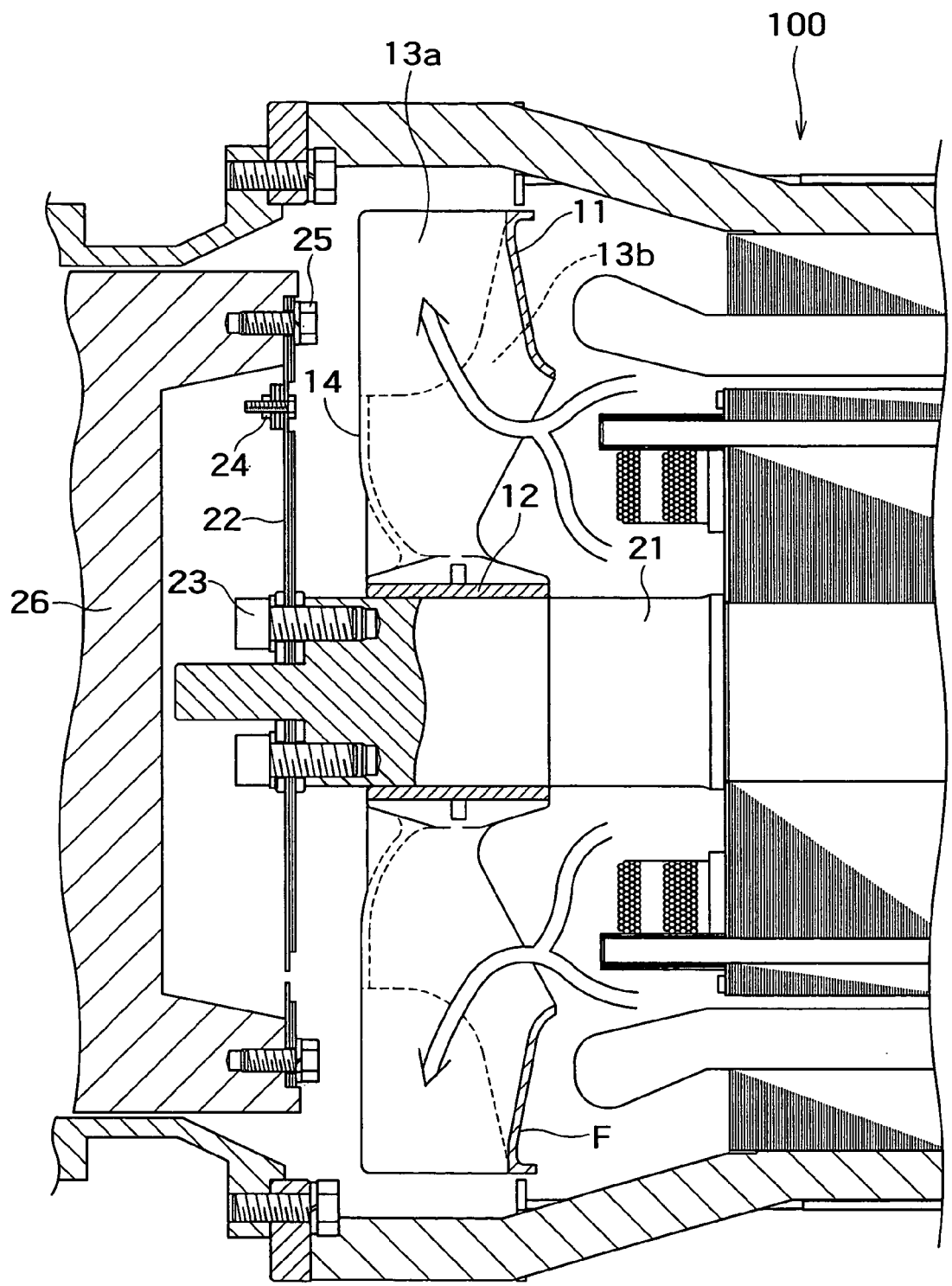
FIG. 2 is a longitudinal sectional view showing a state where the embodiment shown in FIG. 1 is mounted to a generator.

FIG. 2 shows a state where the cooling fan "F" shown in FIG. 1 is mounted to a generator 100. In FIG. 2, the cooling fan "F" is mounted at a rotating shaft 21 of the generator. At the rotating shaft 21, a laminate plate 22 is fixed by a fixing bolt 23, and at the laminate plate 22, a balance weight 24 is mounted and fixed to a fly wheel 26 by a bolt 25.

Thus, a rotating force from an engine, not shown, is stabilized by the fly wheel 26, and the axial vibration is suppressed by the laminate plate 22. And rotation is balanced by the balance weight 24, and the rotating force is transmitted to the generator through the rotating shaft 21.

By rotation of the engine, not shown, the rotating shaft 21 and hence, the cooling fan "F" are rotated, and a cooling air shown by an arrow flow line in FIG. 2 flows along an air channel in the radial direction formed by the main plate 11, the side plate 14 and the impeller blade 13. The cooling air is an air flow along the axial direction of the generator by a negative pressure generated with a centrifugal diffusion action of air by the cooling fan "F".

In the air channel of the cooling fan "F", a part of a wall surface in the radial direction is constituted by the main plate 11 and the side plate 14, and a part in the radial direction is constituted by the impeller blade 13b. Thus, they do not necessarily constitute a long and large air channel as compared with the diameter of the generator.

Nevertheless, since the air channel is established geometrically by the main plate 11, the side plate 14 and the impeller blade 13 along the air flow, the flow of the cooling air can be made uniform and smooth over the entire circumference of the generator, which enables a structure capable of a high cooling effect.

And since the main plate 11 and the side plate 14 are not overlapped with each other when seen from the axial direction of the rotating shaft, dies are simplified and the cooling fan "F" can be manufactured with good mass-production performance.

Moreover, the portion opposite to the hub side of the impeller blade 13b is gouged and forms a space at the portion close to the outer circumference of the laminate plate 22 in the illustrated figure. A tool can be inserted using the space so as to perform fastening work of the bolt 25.

Figure 3:
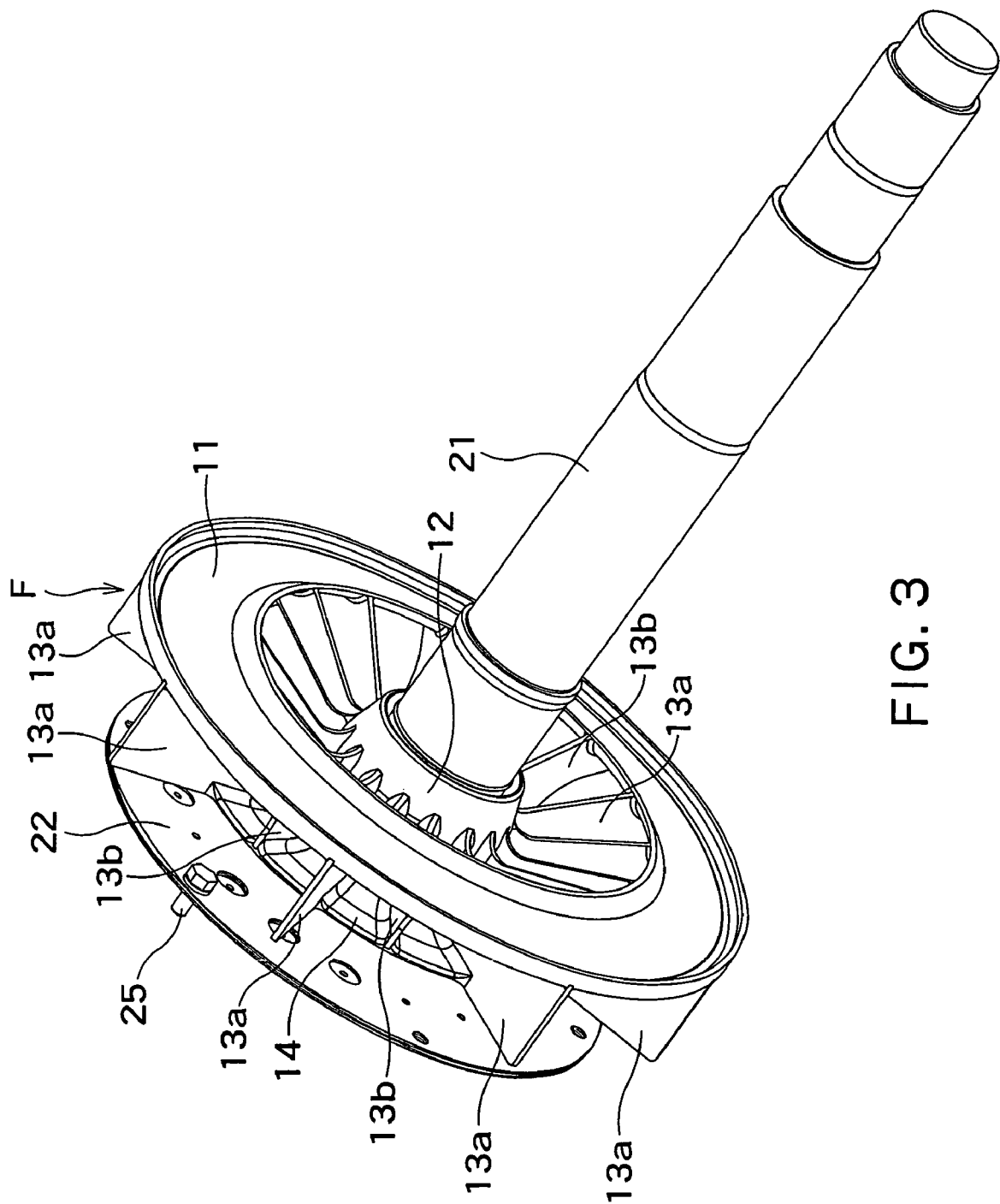
FIG. 3 is a perspective view showing a state where the embodiment shown in FIG. 2 is extracted with a rotating shaft and a laminate plate.
Figure 4:
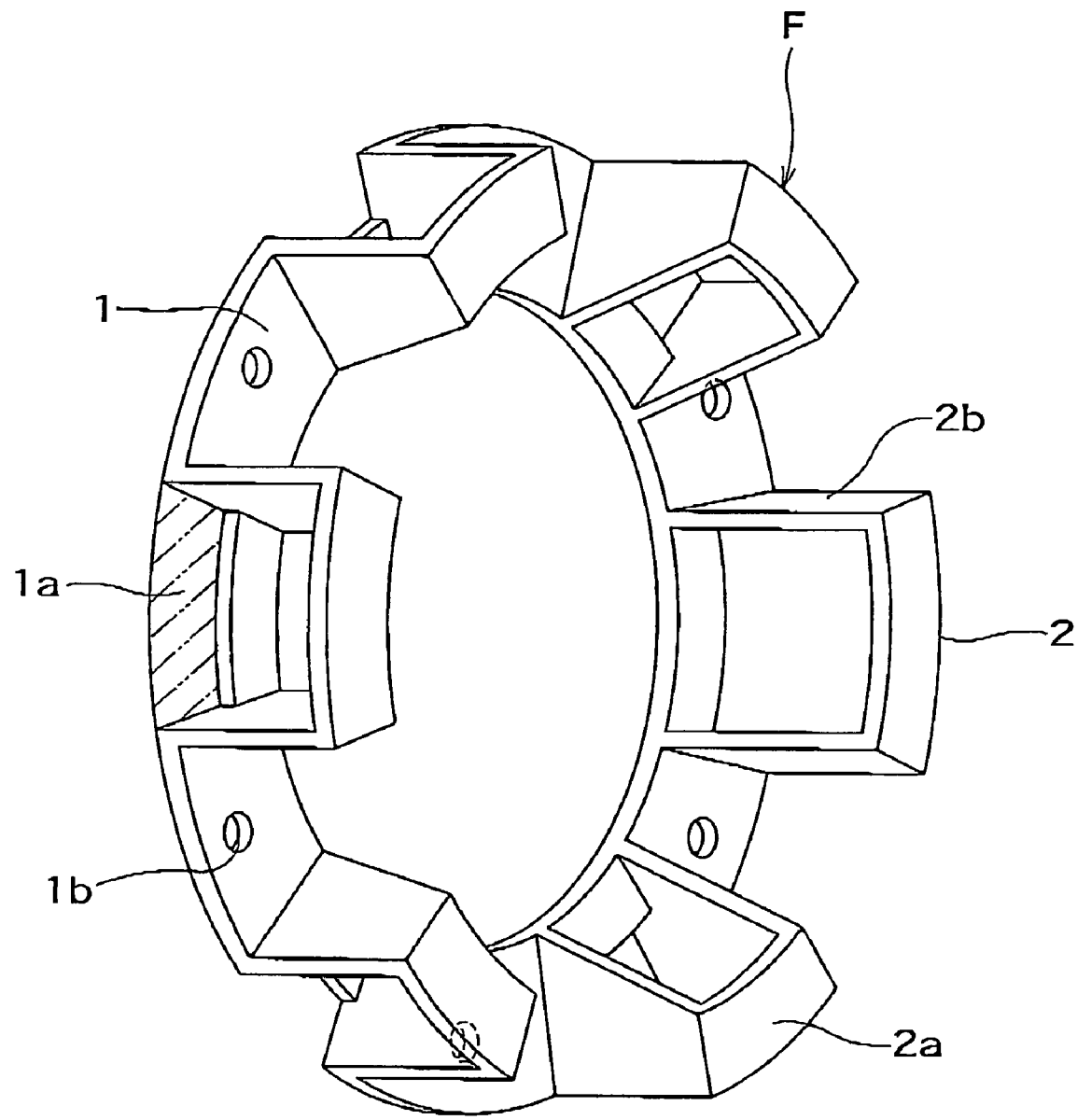
FIG. 4 is a perspective view showing a structure of a conventional cooling fan for a rotating apparatus.

FIG. 3 is a perspective view showing a state where the cooling fan "F", the rotating shaft 21 and the laminate plate 22 shown in FIG. 2 are assembled. This FIG. 3 shows that the position of the bolt 25 fixing the laminate plate 22 matches the position of the impeller blade 13b. Thus, the fastening work of the bolt 25 can be performed with good workability.

Another Embodiment

In the above, an embodiment was shown that the present invention is applied to an engine-driven generator, but the present invention can be also applied to a rotating electrical machine of a gas turbine driving or the like.

What is claimed is:

1. A centrifugal fan mounted on a rotating shaft of a rotating machine for introducing cooling air to said rotating machine, said centrifugal fan comprising:
    a hub mounted about said rotating shaft;
    a main plate formed in a ring shape and disposed concentrically at said hub;
    a side plate in a ring shape having an outer circumference smaller than an inner circumference of said main plate and formed integrally with said hub so that said side plate is disposed with an interval to said main plate in an axial direction of said rotating shaft; and
    a plurality of flat impeller blades implanted on said hub, and disposed along the axial direction of said rotating shaft, and regularly spaced in a radial direction so as to connect said main plate to said hub to form a space between said main plate, said side plate and said hub, some of said impeller blades reaching an outermost circumference portion in said radial direction, while others of the impeller blades reaching only a middle portion in said radial direction,
    said main plate and said side plate being formed so that said main plate and said side plate avoid overlapping with each other when seen from the axial direction of the rotating shaft, and the others of said impeller blades being gouged at portions outward in the radial direction and forming spaces on both sides of the some impeller blades.

2. The centrifugal fan according to claim 1, wherein at least one of two side edge portions of said impeller blades are inclined toward the axial direction of said rotating shaft.

3. The centrifugal fan according to claim 1, wherein at least one of said main plate and said side plate is inclined toward the radial direction so that a ventilation resistance along the axial direction of said rotating shaft is reduced.

4. The centrifugal fan according to claim 1, wherein said side plate has a curved surface for guiding a cooling air flowing in the axial direction of said rotating shaft outward in said radial direction.

* * * * *